July 30, 1929.  S. S. THOMAS  1,722,319
OVEN AND THE LIKE
Filed Oct. 3, 1927  2 Sheets-Sheet 1

Inventor
Stephen S. Thomas
By Thos. C. Davis Jr. Atty.

July 30, 1929.  S. S. THOMAS  1,722,319
OVEN AND THE LIKE
Filed Oct. 3, 1927  2 Sheets-Sheet 2
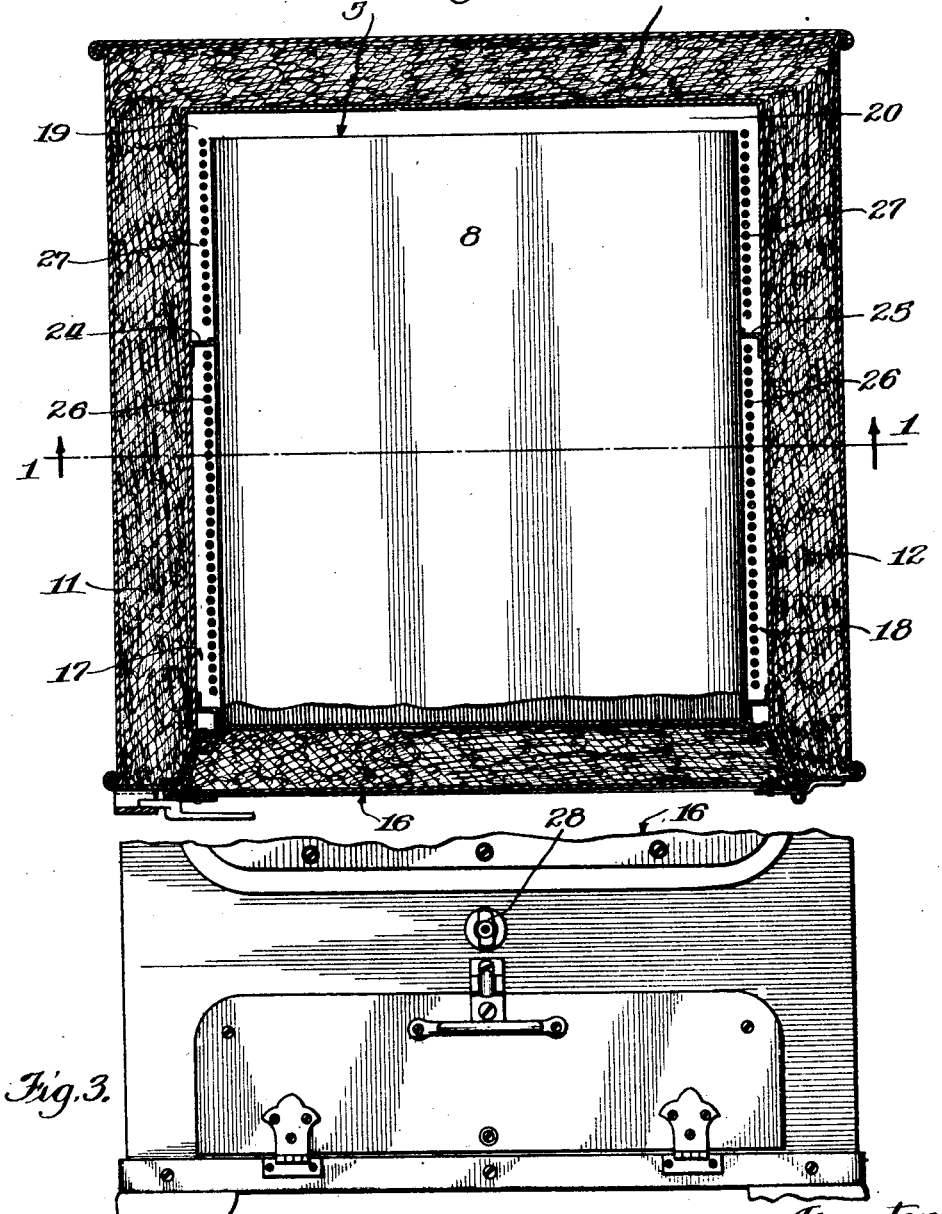

Patented July 30, 1929.

1,722,319

UNITED STATES PATENT OFFICE.

STEPHEN S. THOMAS, OF LEBANON, OHIO.

OVEN AND THE LIKE.

Application filed October 3, 1927. Serial No. 223,675.

This invention has to do with improvements in ovens and the like. The invention has reference particularly to an improved construction of oven which is electrically heated. Furthermore, the oven herein disclosed is heat insulated so that practically all of the heat is retained within the insulated structure.

More particularly, the present invention relates to an electrically heated oven in which the heat unit is carried around the outside of the entire oven shell so that the latter will be heated in a substantially uniform manner on its sides, top and bottom. This heating unit is also so related to the oven shell itself that the latter can be either slipped into place or removed from the structure without having to take apart or disconnect a large number of parts. This oven shell construction, together with the general arrangement of the heat insulating structure, constitutes the subject matter of another and co-pending application for Letters Patent of the United States for improvements in stoves and the like executed by me Sept. 8, 1927. The electrical heating element and arrangement to which the present application particularly relates is of such a construction as to be readily useable in conjunction with oven and heat insulating structures such as those disclosed in the aforesaid co-pending application; but I wish it distinctly understood that I do not intend to limit the use of such heating element with such oven structure except as I may do so in the claims.

Other objects and uses of the invention will appear from a detailed description of the same which consists in the features of construction and combinations of parts hereinafter described and claimed.

In the drawings:

Fig. 2 shows a horizontal section substantially on the line 2—2 of Fig. 1 looking in the direction of the arrows; and Fig. 3 shows a front fragmentary elevation of the lower portion of the structure showing the position of the control switch.

Figure 1:
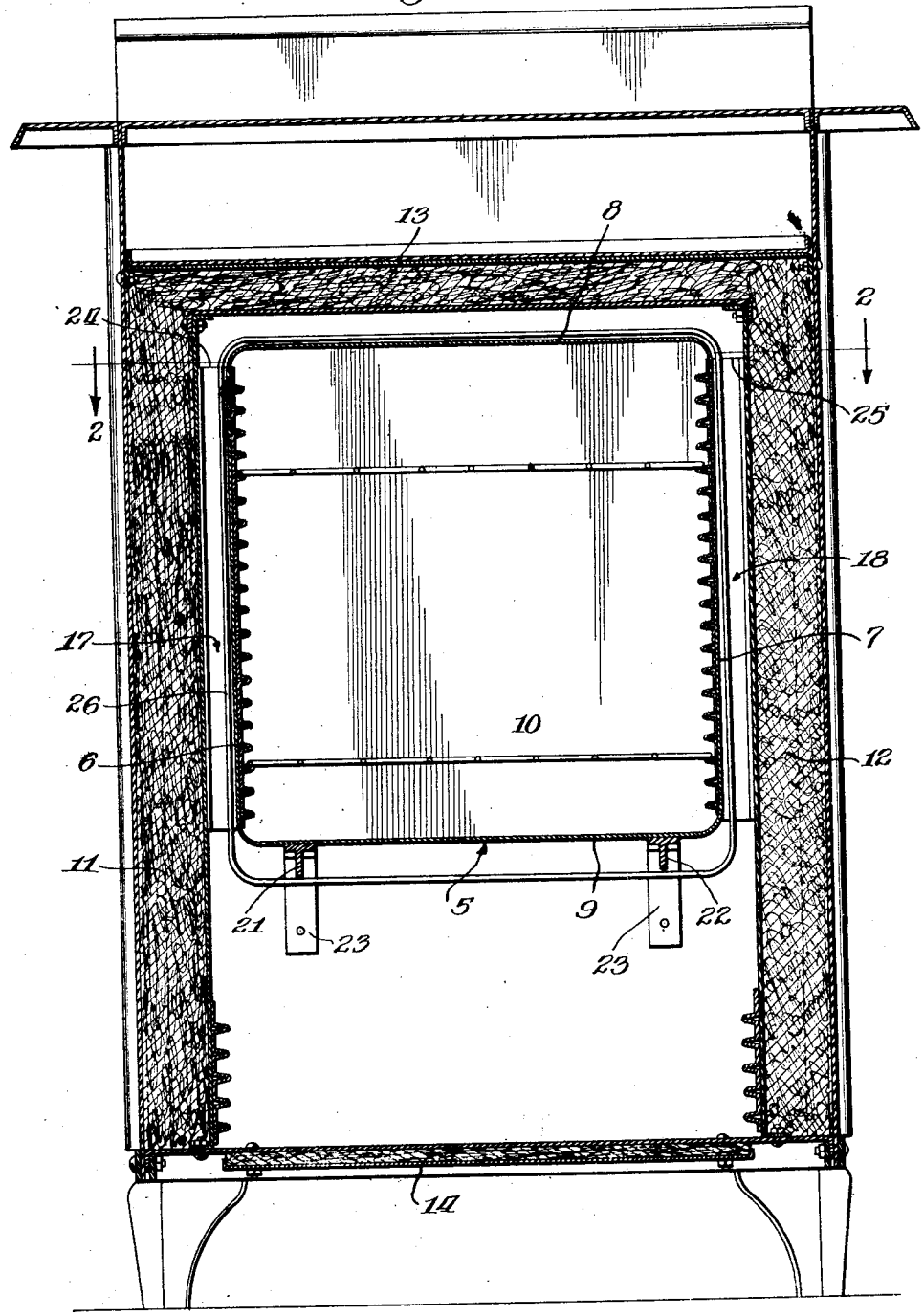
Fig. 1 shows a vertical section through an oven structure embodying the features of the present invention, being taken substantially on the line 1—1 of Fig. 2, looking in the direction of the arrows.

Briefly stated the oven structure herein disclosed includes an oven shell 5 having the side walls 6 and 7, the top 8, and the bottom 9 as well as the back sheet 10. This oven shell structure is so arranged that it can be slipped back into a heat insulating container having the side walls 11 and 12, the top 13, bottom 14, and back 15. A heat insulated door 16 gives access directly into the front of the oven shell 5; and when said door is closed the oven shell itself is sealed in a substantially steam tight manner.

The structure is so arranged as to establish vertical passages 17 and 18 at the sides of the oven shell, and other vertical passages 19 and 20 embracing the rear portions of the sides of the oven shell as well as the back wall thereof.

Preferably the oven shell is directly supported by a pair of horizontal brackets 21 and 22, which extend from front to rear of the structure and are supported by suitable L shaped lugs or the like 23. When the oven shell 5 has been slipped into place it rests directly upon and is supported by said brackets 21 and 22. Preferably also, the oven shell 5 is given lateral support by the vertical angle bars 24 and 25 which are secured to the inside faces of the side walls 11 and 12. These angle bars serve also as partitions separating the passages 17 and 18 from the companion passages 19 and 20 already referred to.

The general type of structure so far disclosed constitutes the subject matter of my co-pending application aforesaid. In that application the oven shell 5 is heated by a suitable gas burner placed beneath the shell but separated therefrom by a false bottom; and furthermore, in the construction of that application the heating gases flow upwardly through the passages 17, 18, 19 and 20 to a suitable point of delivery or discharge flue located in the upper portion of the structure.

According to the present invention I dispense with the gas burner and false bottom structure aforesaid, as well as the discharge flue connections in the upper portion of the structure and in place thereof I substitute an electric heating unit which is of generally rectangular form and extends with its convolutions of heating wires encircling the shell 5 in vertical planes more or less parallel to the front and back walls of the oven. Thus in Fig. 2 there will be seen the groups of heating wires 26 and 27, the group 26 comprising convolutions which encircle that portion of the oven shell 5 located in advance of the partitions 24 and 25, and the group 27 comprising convolutions which encircle the rear portion of the shell 5, being located rearwardly of the partitions 24 and 25.

All of the convolutions of both groups pass underneath the T bar brackets 21 and 22 and over the top of the oven shell so that all of the convolutions are of substantially rectangular form. In this connection it may be noted that the T bar brackets 21 and 22 are preferably removable when the shell 5 is not in place. This result is made possible by resting the ends of the T bar brackets on the supports 23.

A convenient system of installing the electric heating arrangement is as follows:

The convolutions are first formed into a substantially rectangular solenoid of proper size. The shell 5 and T bar brackets 21 and 22 being removed from the rest of the structure, this solenoid may be distorted slightly in shape and then set back through the opening of the door 16. The convolutions of the wire may then be pressed out into the passages 17, 18, 19 and 20, as shown particularly in Figs. 1 and 2; whereupon the backets 21 and 22 may be set back into place; passing above the convolutions as clearly indicated in Fig. 1. The oven shell 5 may be then set back into place and then the structure completed in the usual manner.

It will be noted that during the foregoing operations the convolutions are separated into two groups by the presence of the partitions 24 and 25. This result may be accomplished either by originally forming the convolutions in said groups or by somewhat separating the convolutions from each other at the positions to be occupied by the partitions 24 and 25. In either case it will be understood that a substantially uniform heating effect is produced all around the oven shell. Furthermore, the fact that the lower portions of the convolutions are slightly separated from the bottom 9 of the shell will not materially affect the heating effect since the heat will naturally rise to the shell. In addition to the foregoing, the lower portions of the convolutions will throw a certain amount of heat downwardly which will be effective for broiling and similar operations.

The usual control switch 28 for the electric heating element may be located at any convenient point, preferably on the front of the oven structure immediately beneath the door 16.

It will be noted that the entire structure herein disclosed is such that it can be used either for heating by electrical operations or by the use of burners as disclosed in my aforesaid companion and co-pending application.

While I have herein shown and described only a single embodiment of the features of my present invention, still I do not intend to limit myself thereto except as I may do so in the claims.

I claim:

1. In a device of the class described the combination with a heat insulated chamber of heat insulating construction having a rectangular oven opening in its front wall together with a suitable closure for said opening, of an oven shell located within said chamber and reaching backwardly from said opening and having its front open edge registering with the edge of the opening aforesaid, the axis of said oven shell reaching backwardly in a horizontal direction, said shell being of smaller size than the chamber and thereby establishing vertical passages between the sides of the shell and the side walls of the chamber and also establishing horizontal passages between the top and bottom of the shell and the top and bottom of the chamber, and a solenoid of electric heating wire encircling the oven shell and having its axis parallel to the axis of the oven shell and having its convolutions extending vertically and horizontally through said spaces, substantially as described.

2. In a device of the class described the combination with a heat insulated chamber of heat insulating construction having a rectangular oven opening in its front wall together with a suitable closure for said opening, of a horizontally extending bracket support within said chamber located adjacent to the position of the lower edge of said oven opening, an oven shell located within said chamber and reaching backwardly from said opening and resting upon said bracket and supported thereby, and having the front open edge of said oven shell registering with the edge of the opening aforesaid, the axis of said oven shell reaching backwardly in a horizontal direction, said shell being of smaller size than the chamber to thereby establish vertical passages between the sides of the shell and the side walls of the chamber and also establishing a horizontal passage between the top of the shell and the top of the chamber, there being another horizontal passage within the chamber beneath said bracket and communicating at the sides with the lower ends of the vertical passages aforesaid, and a solenoid of electric heating wire encircling the oven shell and having its axis parallel to the axis of the oven shell and having its convolutions extending vertically through said vertical passages and horizontally through said horizontal passage above the oven shell and horizontally through said passage beneath the bracket aforesaid, substantially as described.

STEPHEN S. THOMAS.